United States Patent Office 3,533,774
Patented Oct. 13, 1970

3,533,774
COMPOSITION AND METHOD FOR SUPPRESSING THE NITRIFICATION OF AMMONIUM NITROGEN IN SOIL
Joyce D. Nault, Walnut Creek, Calif., assignor to The Dow Chemical Company, Midland, Mich., a corporation of Delaware
No Drawing. Filed Mar. 22, 1967, Ser. No. 624,993
Int. Cl. C05f 11/00
U.S. Cl. 71—1     10 Claims

ABSTRACT OF THE DISCLOSURE

The present invention relates to crop culture and is particularly concerned with practices for conserving soil nitrogen and for supplying the soil nitrogen requirements for plant nutrition. These practices involve the employment, as active agent, of an ethynylpyridine compound which is a compound of the formula

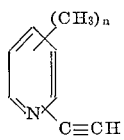

wherein $n$ represents an integer of from 0 to 1, both inclusive, or its mineral acid addition salts.

BACKGROUND OF THE INVENTION

The nature of the agricultural problem for which the present invention constitutes a remedy has previously been discussed in the prior art: see, for example, the introduction to U.S. Pat. 3,050,380.

SUMMARY OF THE INVENTION

The present invention is directed to methods and compositions useful in crop culture. The active agent of such methods and compositions is an ethynylpyridine compound which is a compound of the formula

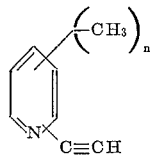

wherein $n$ represents an integer of from 0 to 1, both inclusive, or its mineral acid addition salts.

The methods of the present invention comprise impregnating a plant growth medium with the ethynylpyridine compound, with or without an adjuvant, which can be, among others, a reduced nitrogen fertilizer. The compositions comprise the ethynylpyridine compound in a reduced nitrogen fertilizer.

DESCRIPTION OF THE PREFERRED EMBODIMENTS

By the practice of this invention, the nitrification of ammonium nitrogen in the soil to nitrate nitrogen is suppressed, thereby preventing the rapid loss of ammonium nitrogen from the oil. Furthermore, by proper distribution of the ethynylpyridine compound, this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers.

The expression "reduced nitrogen fertilizers" is employed in the present specification and claims, as understood in the art, as embracing both inorganic and organic nitrogenous materials containing nitrogen in the reduced state. Examples of known reduced nitrogen fertilizers include anhydrous and aqueous ammonia, inorganic ammonium salts such as ammonium phosphate, ammonium nitrate and ammonium sulfate, ammonium salts of organic acids, urea, cyanamide, guanidine nitrate, dicyandiamide, amino acids, guanyl urea sulfate, thiourea, uramon, amines, urea-form and other nitrogen containing organic chemical fertilizers as well as protein mixtures, animal tankages, green manure, fish products, crop residues, and other natural materials known to be sources of ammonium ions in soil. These fertilizer materials contain nitrogenous compounds in which the apparent valency or oxidation state of the nitrogen is from −3 to −1, inclusive. Furthermore, inasmuch as the following equilibrium exists in the presence of water even when the latter is present in minor proportions $$NH_3 + H_2O \rightleftharpoons NH_4OH \rightleftharpoons NH_4^+ + OH^-$$

it is to be understood that when reference is made herein to either ammonium ion or ammonia in soil it is meant to embrace the other component, namely, ammonia or ammonium ion, respectively.

The provision of an effective, nitrification inhibiting, dosage of the ethynylpyridine compound in the soil or growth medium is essential for the practice of the present invention. In general, good results are obtained when the growth medium is impregnated with the ethynylpyridine compound in the amount of from about 0.01 part to about 4000 parts or more by weight per million parts by weight of growth medium. (Hereinafter, the term "p.p.m." is employed as customary to designate parts per million.) The preferred amounts to be employed are dependent upon the particular situation. Thus, in determining the amount to be employed, consideration is made not only of the treatment need, i.e., soil pH, temperature, soil type, etc. but also of the mode of application to sail. When the ethynylpyridine compound is to be applied in a broadcast application, the amount in p.p.m. may frequently be less than in row or band application where for a substantial depth and width within the vicinity of application there can be a very high concentration of the ethynylpyridine compound. When application is made near the root zone of growing plants or when application is made immediately prior to seeding or transplanting, the amounts supplied are frequently at a lower rate than when application is made at the end of the growing season to prepare the soil for the following season. By dispersing very large dosages in growth media, a prolonged inhibition of nitrification can be obtained over a period of many months. The concentration of the active ethynylpyridine compound is eventually reduced to a minimum by decomposition in the soil.

In one method for carrying out the present invention, the ethynylpyridine compound is distributed throughout the growth media in a broadcast application such as by spraying, dusting, distributing in irrigation water, etc. In such application, the ethynylpyridine compound is supplied in amounts sufficient to permeate the growing area of soil with an amount of from about 0.01 to about 1000 p.p.m., and, preferably, from about 2 to about 250 p.p.m. In field administration, the ethynylpyridine compound can be distributed in the soil in the amount of at least 0.02 pound per acre and through such cross-section of the soil as to provide for the presence therein of an effective concentration of the agent. It is usually preferred that the ethynylpyridine compound be distributed to a depth of at least two inches below the soil surface and at a dosage of at least 0.1 pound per acre inch of soil.

In another method for carrying out the present invention, the ethynylpyridine compound is administered to growth medium in a band or row application. In such application, administration is made with or without carrier in amounts sufficient to supply to soil or growth medium a concentration of the ethynylpyridine compound which can be as high as 4000 p.p.m. or more. After administration with or without discing or dragging, subsequent irrigation or rainfall distributes the ethynylpyridine compound throughout the growth medium.

In one embodiment of the present invention, the ethynylpyridine compound is distributed throughout the growth media prior to seeding or transplanting the desired crop plant.

In another embodiment, the soil in the root zone of growing plants is treated with the ethynylpyridine compound in an amount effective to inhibit nitrification but sublethal to plant growth. In such operations, the compounds should be supplied in the soil in amounts which have preferred upper limits at about 50 p.p.m. By following such practice, no adverse effect is exerted by the ethynylpyridine compound upon growth of seeds or plants. Oftentimes it is desirable to treat the soil adjacent to plants, and this procedure may be carried out conveniently in side-dressing operations.

In a further embodiment, soil can be treated with the products following harvest or after fallowing to prevent rapid loss of ammonium nitrogen and to build up the ammonium nitrogen formed by conversion of organic nitrogen compounds. Such practice conserves the soil nitrogen for the following growing season. In such application, the upper limit is primarily an economic consideration.

In an additional embodiment, the soil is treated with the ethynylpyridine compound in conjunction with the application of reduced nitrogen fertilizers. The treatment with the ethynylpyridine compound can be carried out prior to, subsequent to or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of the ethynylpyridine compound in an ammonium nitrogen fertilizer composition constitutes a preferred embodiment of the present invention.

The present invention can be carried out by distributing the ethynylpyridine compound in an unmodified form through growth medium. The present method also embraces distributing the compound as a constituent in liquid or finely divided solid compositions. In such practice, the ethynylpyridine compound can be modified with one or more addicaments or soil treating adjuvants including water, petroleum distillates or other liquid carriers, surface-active dispersing agents, inert finely divided solids and fertilizers such as reduced nitrogen fertilizers. Preferred adjuvants are surface-active dispersing agents, inert finely divided solids, and, especially, reduced nitrogen fertilizers; these adjuvants cooperate with the ethynylpyridine compound so as to facilitate the practice of the present invention and to obtain an improved result. Depending upon the concentration of the ethynylpyridine compound, augmented compositions can be distributed in the soil without further modification or can be considered as concentrates and subsequently diluted with additional inert carrier to produce the ultimate treating composition. The required amount of the ethynylpyridine compound can be supplied to growth media in from 1 to 50 gallons of organic solvent carrier, in from 5 to 27,000 or more gallons of aqueous carrier or in from 20 to 2,000 pounds of solid carrier per acre treated. When an organic solvent carrier is employed, it can be further dispersed in the above volume of aqueous liquid carrier.

The concentration of the ethynylpyridine compound in compositions to be employed for the treatment of growth media is not critical and can vary considerably provided the required dosage of effective agent is supplied to the growth media. In general, good results are obtained with liquid compositions containing from about 0.00001 to about 0.25 precent by weight of the ethynylpyridine compound; in some operations, however, compositions containing amounts of ethynylpyridine compound in excess of 0.25 percent, such as from 2 to 98 percent of ethynylpyridine compound by weight of composition are conveniently employed, as for example, in row or band application. With dusts, good results are usually obtained with compositions containing from 0.0001 to 10 percent or more by weight of ethynylpyridine compound. In some circumstances, such as in high-intensity application, however, it is preferred to employ dust compositions containing as much as from 2 to 98 percent or more by weight of ethynylpyridine compound. Liquid or dust compositions in which the ethylnylpyridine compound is present in higher concentration can be utilized as such or can be employed as concentrate compositions to be diluted to prepare actual treating compositions.

Liquid compositions containing the desired amount of the ethynylpyridine compound can be prepared by dispersing the latter in one or more liquid carriers such as water or an organic solvent, with or without the aid of a suitable surface-active dispersing agent or emulsifying agent. Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the growth media. When the solutions of the ethynylpyridine compound in organic solvents are to be further diluted to produce aqueous dispersions, the preferred solvents include acetone and the alcohols. When the liquid carrier is entirely organic in nature, particularly desirable carriers are the petroleum distillates boiling almost entirely under 400° F. at atmospheric pressure and having a flash point above about 80° F. Dispersing and emulsifying agents which can be employed in liquid compositions include condensation products of alkylene oxides with phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent by weight of the ethynylpyridine compound.

Solid compositions containing the active agent can be prepared by dispersing the latter in finely divided inert solid carriers such as talc, chalk, gypsum, vermiculite, bentonite and the like, fuller's earth, attapulgite and other clays, various solid detergent dispersing agents and solid fertilizer compositions. In preparing such compositions, the carrier is mechanically ground with the ethynylpyridine compound or wet with a solution or dispersion thereof in a volatile organic solvent. Depending upon the proportions of ingredients, these compositions can be employed without further modification or be considered as concentrates and subsequently further diluted with solid surface-active dispersing agent, talc, chalk, gypsum, or the like to obtain the desired treating composition. Furthermore, such concentrate compositions can be dispersed in water with or without added dispersing agent or agents to prepare aqueous soil treating compositions.

Soil treatment compositions can be prepared by dispersing the ethynylpyridine compound in fertilizers such as ammonium fertilizer or organic nitrogen fertilizer. The resulting fertilizer composition can be employed as such or can be modified as by dilution with additional nitrogen fertilizer or with inert solid carrier to obtain a composition containing the desired amount of active agent for treatment of soil. Further, an aqueous dispersion of the ethynylpyridine compound-fertilizer composition can be prepared and administered to the growth medium. Fertilizer compositions comprising the ethynylpyridine compound in intimate admixture with ammonium fertilizers constitute preferred embodiments of the present invention.

In fertilizer compositions comprising a reduced nitrogen fertilizer, it is desirable that the ethynylpyridine compound be present in an amount of at least about 0.05 percent by weight based on the weight of the nitrogen present in the fertilizer as reduced nitrogen and can be present in amounts as high as 95 percent by weight of the reduced nitrogen in the fertilizer. Generally, though, amounts of ethynylpyridine compound in excess of about 25 percent yield no greater advantage and are therefore seldom used. Thus, when a fertilizer composition contains both reduced nitrogen and other forms of nitrogen, such as in the case of ammonium nitrate fertilizer compositions, the amount of ethynylpyridine compound is based on the weight of nitrogen present in the ammonium component.

In operations carried out in accordance with the present invention, the soil can be impregnated in any convenient fashion with the active ethynylpyridine compound or a composition containing the latter. For example, these modified or unmodified compositions can be mechanically mixed with the soil; applied to the surface of soil and thereafter dragged or disced into the soil to a desired depth; or transported into the soil with a liquid carrier such as by injection, spraying or irrigation. When the distribution is carried out by introducing the ethynylpyridine compound in the water employed to irrigate the soil, the amount of water is varied in accordance with the moisture content of the soil in order to obtain a distribution of the ethynylpyridine compound to the desired depth. The ethynylpyridine compound can be readily and conveniently distributed to a depth of a few inches to four feet by irrigation methods. The preferred methods embrace procedures using any of these steps or combination of steps wherein ethynylpyridine compound is distributed in the soil substantially simultaneously with a reduced nitrogen fertilizer.

The following examples illustrate the invention but are not to be construed as limiting.

Example 1

An aqueous ammonium fertilizer composition containing 500 parts by weight of nitrogen and 25 parts by weight of 3-ethynylpyridine per million parts of aqueous medium was prepared by dispersing a 1 percent (weight by volume of solvent) acetone solution of 3-ethynylpyridine in aqueous ammonium sulfate solution. (The amount of nitrogen in all examples is based on the nitrogen present in the fertilizer in the reduced form.)

The composition so prepared was employed to treat seed beds of sandy loam soil having a pH of about 8, containing essentially no organic material and having been freed of nitrite and nitrate nitrogen by prior thorough leaching. The seed beds were in containers which admitted of being sealed to prevent loss of moisture. In the treating operation, the composition was applied to the seed beds as a soil drench, and the soil in the beds thoroughly mixed to insure a substantially uniform distribution of the composition throughout the soil. The amount of composition employed was sufficient to supply 100 parts by weight of nitrogen and 5 parts by weight of 3-ethynylpyridine per million parts by weight of soil. In a check operation, other seed beds similarly prepared were fertilized with a similar aqueous fertilizer composition containing the same amount of acetone but no 3-ethynylpyridine. The composition was applied in an amount to supply the same concentration of nitrogen to the soil as the treating composition containing 3-ethynylpyridine. All of the seed beds were then sealed and the soil maintained at about 70° F. for a period of fourteen days.

At the end of the fourteen day period, the seals were removed from all seed beds, samples of soil taken from the different seed beds, and the extent of nitrification of the added ammonium sulfate fertilizer determined by analyses for combined nitrate plus nitrite nitrogen. The determinations were carried out by extracting the nitrate and nitrite from the soil with a saturated calcium sulfate solution, developing color in the clear supernatant of the extract with diphenylamine in sulfuric acid, and comparing the color with a standard solution containing known concentrations of nitrate and nitrite ions. This procedure is similar to that described in "Colorimetric Methods of Analysis" by F. D. Snell and C. T. Snell, D. Van Nostrand Company, Inc., volume II, 3rd edition, page 801.

The percent nitrification of added ammonium sulfate in the seed beds treated with 3-ethynylpyridine was found to be 0 percent, whereas the percent nitrification of added ammonium sulfate in the check beds was found to be 100 percent.

Example 2

An operation is carried out in the manner described in Example 1 except that the active agent is 3-ethynylpyridine hydrochloride.

Determinations made at the end of fourteen days show that soil treated with fertilizer compositions containing 3-ethynylpyridine hydrochloride undergoes no substantial nitrification while soil treated with fertilizer compositions containing no 3-ethynylpyridine undergoes complete nitrification.

Example 3

An aqueous ammonium fertilizer composition containing 1,000 parts by weight of nitrogen and 25 parts by weight of 3-ethynylpyridine per million parts of aqueous medium was prepared by dispersing a 2 percent (weight by volume of solvent) acetone solution of 3-ethynylpyridine in aqueous ammonium sulfate solution.

The composition so prepared was employed to treat seed beds of sandy loam soil having a pH of about 8, containing essentially no organic material and having been freed of nitrite and nitrate nitrogen by prior thorough leaching. The seed beds were in containers which admitted of being sealed to prevent loss of moisture. In the treating operation, the composition was applied to the seed beds as a soil drench, and the soil in the beds thoroughly mixed to insure a substantially uniform distribution of the composition throughout the soil. The amount of composition employed was sufficient to supply 200 parts by weight of nitrogen and 5 parts by weight of 3-ethynylpyridine per million parts by weight of soil. In a check operation, other seed beds similarly prepared were fertilized with a similar aqueous fertilizer composition containing the same amount of acetone and ammonium sulfate but no 3-ethynylpyridine. The composition was applied in an amount to supply the same concentration of nitrogen to the soil as the treating composition containing 3-ethynylpyridine. All of the seed beds were then sealed and the soil temperature of all beds maintained at about 70° F. for a period of about four weeks. At the end of the first, second, and third weeks, the seals were removed to aerate the soil briefly and then replaced. At the end of the four week period, the seals were finally removed. Samples of soil were taken from the different seed beds and the soil samples analyzed for the presence of ammonium nitrogen. The analysis was carried out by distillation of the soil, in the presence of magnesium oxide, to obtain ammonia, sorption of the resulting ammonia by boric acid, and titration of the resulting solution with a standard solution of hydrochloric acid. From these operations, the amount of ammonium nitrogen in the soil was calculated. This method of analysis for ammonium nitrogen is a slight modification of that described by Black on page 1198 of "Methods of Soils Analysis," No. 2, American Society of Agronomy, Inc., Madison, Wis., 1965.

From the soil of the seed beds treated with 3-ethynylpyridine, 190 parts of ammonium nitrogen were recovered, whereas from the soil of the check seed beds, no ammonium nitrogen was recovered.

Example 4

4-ethynylpyridine was evaluated in the procedures of

Example 3 except that the concentration was employed at a lower concentration. More particularly, a 0.8 percent acetone solution of 4-ethynylpyridine was prepared and subsequently dispersed in aqueous ammonium sulfate solution to obtain an aqueous ammonium fertilizer composition containing 1000 parts by weight of nitrogen. This composition was applied to soil beds to give a concentration of nitrogen therein of 200 parts by weight and a concentration of 4-ethynylpyridine therein of 2 parts by weight per million parts by weight of soil. The amount of recovered ammonium nitrogen was determined for each of the treating compositions and the check. The results were as presented in the following table.

TABLE I

| Parts of 4-ethynylpyridine per million parts by weight of soil: | Amount of recovered ammonium nitrogen in parts per million of soil |
|---|---|
| 2 | 192 |
| 0 (check) | 0 |

Example 5

Another experiment was carried out in the manner of Example 3 employing 3-ethynylpyridine but at lower concentrations. Aqueous ammonium fertilizer compositions containing 1000 parts by weight of nitrogen and varying amounts of 3-ethynylpyridine per million parts of aqueous media were prepared by dispersing acetone solutions containing (on the basis of weight by volume of solvent) 0.8, 0.4, 0.2, and 0.08 percent, respectively, of 3-ethynylpyridine in aqueous ammonium sulfate. These compositions were applied to soil beds to give a concentration of nitrogen therein of 200 parts by weight and a concentration of the 3-ethynylpyridine compound of 2, 1, 0.5, and 0.2, respectively, parts by weight per million parts by weight of soil. The amount of recovered ammonium nitrogen was determined for each of the treating compositions and the check. The results were as presented in the following table.

TABLE II

| Parts of 3-ethynylpyridine per million parts by weight of soil: | Amount of recovered ammonium nitrogen in parts per million of soil |
|---|---|
| 2 | 200 |
| 1 | 190 |
| 0.5 | 195 |
| 0.2 | 200 |
| 0 (check) | 0 |

Example 6

Operations were carried out in accordance with the procedures of Example 5 except that different ethynylpyridine compounds were evaluated. The ethynylpyridine compounds employed in the operations reported herein were 5-ethynyl-2-picoline and 2-ethynylpyridine. The results were as reported in the following table.

TABLE III

| | Parts of ethynyl-pyridine compound per million parts by weight of soil | Amount of recovered ammonium nitrogen in parts per million of soil |
|---|---|---|
| 5-ethynyl-2-picoline | 2 | 196 |
| | 0.5 | 200 |
| | 0.2 | 200 |
| | 0.05 | 196 |
| 2-ethynyl-pyridine | 2 | 200 |
| | 1 | 198 |
| | 0.5 | 200 |
| | 0.2 | 200 |

Example 7

Aqueous soil-treating compositions were prepared as follows: (1) an inhibitor component was prepared by dissolving an amount of 3-ethynylpyridine in each of four separate quantities of acetone to prepare four solutions of the 3-ethynylpyridine in acetone, the concentration of the 3-ethynylpyridine being 4, 2, 1, and 0.5 percent (weight per volume), respectively; (2) a fertilizer component was prepared by mixing an emulsifying agent (polyethylene glycol 600 oleate) in aqua ammonia containing 21 to 23 percent nitrogen; and (3) thereafter mixing together, in varying ratios, portions of the inhibitor component and portions of the fertilizer component. The resulting compositions contained 3-ethynylpyridine in amounts of 2, 1, 0.5 and 0.25 percent by weight of the nitrogen in the composition. Seed beds of sandy loam soil having a pH of 8 to 12 percent moisture content were treated with the above described compositions. Treatment was carried out in such rate as to provide for a concentration of 125 parts of nitrogen by weight and by injection of the treating composition into the soil at a point about three inches below the soil surface. Other seed beds having the same characteristics were treated with compositions differing from the foregoing only by the absence of the 3-ethynylpyridine. Following the treatment, all seed beds were maintained at 70° F. for 30 days. At the end of this time the treated and check seed beds were analyzed for ammonium nitrogen in accordance with the same procedures reported in Example 2. The results of the operations were as reported in Table IV.

TABLE IV

| Parts of 3-ethynylpyridine by weight of nitrogen: | Recovery of ammonium nitrogen as expressed in parts of ammonium nitrogen, by weight, per million parts by weight of soil |
|---|---|
| 2 | 80 |
| 1 | 72 |
| 0.5 | 77 |
| 0.25 | 74 |
| 0 (check) | 0 |

Example 8

A solid fertilizer composition was prepared as follows: (1) an inhibitor component was prepared by (a) mixing and grinding together 0.1 gram of 3-ethynylpyridine and 0.15 gram of attapulgite, (b) adding 0.75 gram of pyrophyllite thereto and grinding the resulting mixture until a finely powdered uniform composition was obtained; (2) a fertilizer component was prepared by hammermilling together a 50:50 mixture by weight of ammonium sulfate and pyrophyllite to obtain a fine uniform composition; (3) the inhibitor component and fertilizer component were mixed together on a roller mill to obtain a soil-treating composition containing 3-ethynylpyridine in varying concentrations expressed as percent based on the nitrogen in the composition. These varying concentrations were as follows: 1, 0.5, 0.25, and 0.1 percent. These compositions were employed to fertilize various beds of sandy loam soil containing essentially no organic material, having a pH of about 8, and having a moisture content of about 20 percent. The soil employed had been previously leached to remove all nitrate and nitrite nitrogen constituents. The beds were in containers which admitted of being sealed to prevent loss of moisture. The concentration of 3-ethynylpyridine by weight per million parts by weight of soil varied as the concentrations of 3-ethynylpyridine in the treating composition varied: thus, the employed composition supplied to the soil 2, 1, 0.5, and 0.2, respectively, parts by weight of 3-ethynylpyridine per million parts by weight of soil.

The seed beds were fertilized in areas to be planted by providing depressions and adding thereto the fertilizer treating composition and then covering the composition with soil. The amount of composition employed was sufficient to supply 206 parts of nitrogen by weight per million parts by weight of soil. Thereupon, the seed beds were sealed to prevent loss of moisture and the soil maintained at temperatures of about 70° F. for four weeks. At 7 day intervals, the seals were removed, air passed over the soil, and the seals then replaced. At the end of the four week period, the seals were finally removed and samples of soil were analyzed, as described in Example 3, for ammonium nitrogen content. The results were compared with check seed beds wherein no 3-ethynylpyridine was added to the fertilizer composition but which were otherwise indentically handled. The results obtained are given in Table V.

TABLE V

| Parts of 3-ethynylpyridine by weight per million parts by weight of soil: | Recovery of ammonium nitrogen, as expressed in parts of ammonium nitrogen, by weight, per million parts by weight of soil |
|---|---|
| 2 | 180 |
| 1 | 183 |
| 0.5 | 174 |
| 0.2 | 184 |
| 0 (check) | 0 |

Example 9

Concentrate compositions are prepared as follows:

(A) 25 parts by weight of 3-ethynylpyridine, 65 parts by weight of xylene and 10 parts by weight of an alkylated aryl polyether alcohol are mechanically mixed together to obtain an emulsifiable liquid composition.

(B) 90 parts by weight of 3-ethynylpyridine sulfate and 10 parts by weight of an alkyl aryl sulfonate are mechanically mixed together to obtain a water-dispersible mixture.

A composition of each of the two foregoing types is similarly prepared with each of 5-ethynyl-2-picoline and 2-ethynylpyridine.

These compositions can be dispersed in water to produce aqueous compositions having desirable wetting and penetrating properties. These aqueous compositions are then employed to treat soil in an amount sufficient to distribute the active agent therein in effective concentrations. The concentrates can also be dispersed in aqua ammonia to prepare fertilizer compositions.

Example 10

Fertilizer compositions are prepared as follows:

(A) 3-ethynylpyridine is mechanically mixed with diammonium phosphate to prepare reduced nitrogen fertilizer compositions containing 5 percent by weight of 3-ethynylpyridine.

(B) the nitrate salt of 3-ethynylpyridine is mechanically mixed with ammonium nitrate to prepare reduced nitrogen fertilizer compositions containing 3 percent by weight of the nitrate salt of 3-ethynylpyridine.

(C) 3-ethynylpyridine hydrochloride is mechanically mixed with urea to prepare reduced nitrogen fertilizer compositions containing 2 percent by weight of 3-ethynylpyridine hydrochloride.

A composition of each of these three types is similarly prepared with each of 4-ethynylpyridine, 5-ethynyl-3-picoline, and 6-ethynyl-4-picoline.

These fertilizer compositions are distributed in soil to supply the nitrogen requirements for plant nutrition. The treated soil is resistant to nitrification and provides nitrogen available for plant growth over a prolonged period of time.

The various ethynylpicoline compounds to be employed in accordance with the present invention (those compounds wherein n represents 1) are prepared in known procedures either from the corresponding vinylpicolines or from the corresponding dimethylpyridines. In the instance of the dimethylpyridines, the substances are treated with formaldehyde and dehydrated to convert one of the methyl groups into the desired ethynyl moiety. In the instance of the vinylpicolines, the substances are dehydrogenated to convert the vinyl group into the desired ethynyl moiety. Furthermore, many of the ethynylpicolines are conveniently prepared by halogenating a vinylpicoline to obtain the corresponding (1-haloethenyl)picoline compound, which is then dehydrobrominated to obtain the ethynylpicoline.

Hence, in the foregoing methods there are prepared all of the ethynylpicoline compounds to be employed in accordance with the present invention: 3-ethynyl-2-picoline; 4-ethynyl-2-picoline; 5-ethynyl-2-picoline; 6-ethynyl-2-picoline; 2-ethynyl-3-picoline; 4-ethynyl-3-picoline; 5-ethynyl-3-picoline; 6-ethynyl-3-picoline; 2-ethynyl-4-picoline; and 3-ethynyl-4-picoline.

The mineral acid addition salts to be employed in accordance with the present invention are prepared in standard procedures, in which the ethynylpyridine compound of the formula

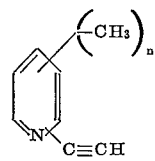

that is, ethynylpyridine compound in its base form, is reacted with the desired mineral acid. The reaction is carried out in a liquid reaction medium and the reactants are employed in amounts representing stoichiometric proportions. The reaction goes forward readily at room temperatures with the preparation of the desired salt product, which typically appears in the liquid reaction mixture as a crystalline solid. The product, a solid, is separated by filtration or decantation, or the liquid reaction mixture can be removed by evaporation to separate the product. The salt products are generally of low solubility in organic liquids and of moderate solubility in water. A particularly preferred salt product is the salt with hydrochloric acid.

When it is desired that one of the salt products of the present invention be applied to soil simultaneously with the application of a nitrogen fertilizer, it is often preferred that the specific salt product be prepared in conjunction with the preparation of the nitrogen fertilizer. Representative nitrogen fertilizers for which such procedures are particularly appropriate are ammonium phosphate, ammonium sulfate, ammonium nitrate, and ammonium chloride. In these procedures, the base form of ethynylpyridine compound is reacted with the given mineral acid simultaneously with its reaction to form the respective nitrogen fertilizer. The resulting product comprises the given nitrogen fertilizer or fertilizers and the corresponding ethynylpyridine compound in salt form and is advantageously employed in the practice of the present invention.

I claim:

1. A method for suppressing the nitrification of ammonium nitrogen in a plant growth medium which comprises impregnating an ammonium nitrogen containing plant growth medium with an active agent which is a compound of the formula

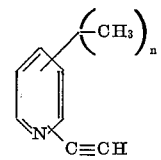

wherein n represents an integer of from 0 to 1, both inclusive, or its mineral acid addition salts, said active agent being employed in an amount sufficient to inhibit nitrification of said ammonium nitrogen present in said plant growth medium.

2. The method of claim 1 wherein the active agent is 3-ethynylpyridine.

3. The method of claim 1 wherein the active agent compound is added to the plant growth medium in an amount sufficient to give a concentration therein of from 2 to 250 parts by weight per million parts by weight of growth medium.

4. The method of claim 1 wherein the active agent is introduced into the plant growth medium at a point near roots of plants growing in the plant growth medium.

5. Method of claim 1 wherein the plant growth medium is soil and the active agent is employed as a composition comprising the active agent, and in intimate admixture therewith, a soil treating adjuvant.

6. The method of claim 5 wherein the soil treating adjuvant is a reduced nitrogen fertilizer.

7. The method of claim 5 wherein the active agent is 3-ethynylpyridine.

8. In the fertilization of soil with a fertilizer composition comprising a major amount of a reduced nitrogen fertilizer as a source of ammonium ions, the step which comprises impregnating said soil with an active agent which is a compound of the formula

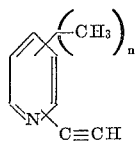

wherein $n$ represents an integer of from 0 to 1, both inclusive, or its mineral acid addition salts in an operation substantially simultaneous with the administration of the reduced nitrogen fertilizer, wherein said impregnation is carried out in the growing area of soil in an amount sufficient to inhibit nitrification of ammonium nitrogen present therein, said amount being sufficient to provide in said soil a concentration of the active agent of at least 0.01 part by weight per million.

9. A fertilizer composition comprising a major amount of a reduced nitrogen fertilizer as a source of ammonium ions and an active agent which is a compound of the formula

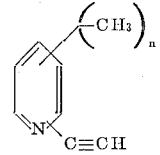

wherein $n$ represents an integer of from 0 to 1, both inclusive, or its mineral acid addition salts, wherein the active agent is present in a concentration of at least about 0.05 percent by weight based on the weight of the reduced nitrogen present in the fertilizer.

10. The composition of claim 9 wherein the active agent is 3-ethynylpyridine.

References Cited

UNITED STATES PATENTS

| | | | |
|---|---|---|---|
| 3,009,805 | 11/1961 | Goring | 71—11 X |
| 3,011,885 | 12/1961 | Goring | 71—1 |
| 3,047,378 | 7/1962 | Goring | 71—1 |
| 3,050,381 | 8/1962 | Goring | 71—1 |
| 3,050,382 | 8/1962 | Goring | 71—1 |
| 3,135,594 | 6/1964 | Goring | 71—11 |
| 3,256,083 | 6/1966 | Goring | 71—1 |
| 3,284,188 | 11/1966 | Amagasa et al. | 71—54 |

REUBEN FRIEDMAN, Primary Examiner

R. BARNES, Assistant Examiner

U.S. Cl. X.R.

71—27, 61